(12) United States Patent
Wright

(10) Patent No.: US 7,042,985 B1
(45) Date of Patent: May 9, 2006

(54) METHOD, SYSTEM AND COMPUTER PROGRAM PRODUCT FOR PROVIDING A REGIONAL E911 NETWORK

(75) Inventor: Ronald Paul Wright, Franklin, TN (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 338 days.

(21) Appl. No.: 10/650,437

(22) Filed: Aug. 27, 2003

(51) Int. Cl.
*H04M 11/04* (2006.01)

(52) U.S. Cl. .................... 379/45; 379/37; 370/352

(58) Field of Classification Search ........... 379/37–49, 379/90.01, 221.08, 221.09, 221.1, 221.12; 370/352; 455/575; 709/206
See application file for complete search history.

(56) References Cited

U.S. PATENT DOCUMENTS

| | | | | |
|---|---|---|---|---|
| 6,016,478 A | | 1/2000 | Zhang et al. ................ 705/9 |
| 6,041,222 A | * | 3/2000 | Horton et al. .............. 455/255 |
| 6,064,722 A | * | 5/2000 | Clise et al. ................. 379/37 |
| 6,185,282 B1 | | 2/2001 | Bocckman et al. .......... 379/45 |
| 6,363,138 B1 | * | 3/2002 | Aprile ......................... 379/45 |
| 6,427,001 B1 | * | 7/2002 | Contractor et al. ......... 379/45 |
| 6,704,294 B1 | * | 3/2004 | Cruickshank ............. 370/265 |
| 6,775,356 B1 | * | 8/2004 | Salvucci et al. ............ 379/49 |
| 6,807,564 B1 | * | 10/2004 | Zellner et al. ............. 709/206 |
| 2001/0021646 A1 | | 9/2001 | Antonucci et al. ......... 455/404 |
| 2004/0057425 A1 | * | 3/2004 | Brouwer et al. ........... 370/352 |

* cited by examiner

*Primary Examiner*—Melur Ramakrishnaiah
(74) *Attorney, Agent, or Firm*—Cantor Colburn LLP (57) ABSTRACT

A method for providing a regional E911 edge network. The method includes assigning public safety answering points (PSAPs) to ports located in a telephone network, where each of the ports is associated with a calling party number (CPN) and a geographic location. The method also includes identifying an incoming emergency call from an IP device. The IP device corresponds to a unique machine access code address and the incoming emergency call includes an incoming CPN. The entry port associated with the IP device is determined based on the unique machine access code address and the incoming CPN. The incoming emergency call is connected to the PSAP corresponding to the entry port. The CPN and the geographic location data are transmitted to the PSAP corresponding to the entry port.

25 Claims, 6 Drawing Sheets

METHOD, SYSTEM AND COMPUTER PROGRAM PRODUCT FOR PROVIDING A REGIONAL E911 NETWORK

FIELD OF THE INVENTION

The present disclosure relates generally to providing a regional E911 network and in particular, to a method of determining the geographic origin of a 911 telephone call.

BACKGROUND OF THE INVENTION

When a caller calls an emergency number, e.g. 911 (E911), the call is routed to a public safety answering point (PSAP). In some jurisdictions, regulatory agencies require that the caller's telephone number/callback number and/or precise physical location referred to as an Emergency Location Identification Number (ELIN), be automatically provided to the PSAP. The information in the ELIN is used to locate the caller and to call back the caller should there be a disconnect.

A caller identification (i.e., telephone number and ELIN) may be delivered to the PSAP either in-band (e.g., using DTMF signaling) or out-of-band (e.g., using ISDN signaling) depending on the type of trunk circuit employed. Normally, for residential callers, calling party number (CPN) is sufficient for PSAPs. In some cases, the ELIN is substituted with earth coordinates or geo-positional synchronous (GPS) data or other geodetic data.

Digitally encoded voice communications that are transmitted over a network, using what is typically referred to as voice over Internet protocol (VoIP) may originate anywhere and possibly, follow a circuitous route to a distant destination for far-end hop-off to a public service telephone network (PSTN). Thus, placing an E911 call over a VoIP enabled telephone network may be a problem. Currently, it is not possible in an IP network (e.g., VoIP) to identify the source location of an originating device whose destination is 911 (or other emergency number) and to route the call to the proper PSAP jurisdiction (or other designated jurisdiction).

A database called an automatic location information (ALI) database is associated with one or more PSAPs. The ALI database is generally part of a database management system having a database server through which the ALI database is queried. The ALI database contains records that associate telephone numbers (e.g., CPNs) with locations. When a telephone call is made to 911, the ALI database is queried for location information. The query may contain the telephone number associated with the telephone that made the 911 telephone call. In response to the query, the ALI database passes geographic location information back to the PSAP. This information is used to route the telephone call to the proper PSAP and is also made available to the 911 operators located at the PSAP.

Currently, 911 calls are routed on multi-frequency (MF) trunks through 911 tandems. Each of these tandems includes a separate 911 ALI database for the area that it serves. Currently, Internet Protocol (IP) devices are available to allow a customer to utilize an IP telephone and still have advanced calling features such as call-waiting and call-forwarding. However, when the IP device is moved to a different IP port, either inside or outside of the geographic region being served by the original 911 tandem, there is no way to associate the customer information (e.g., geographic location) with the 911 telephone call in order to route the telephone call to the PSAP or to provide information to the 911 operator.

SUMMARY OF THE INVENTION

Embodiments of the present invention include a method for providing a regional E911 edge network. The method includes assigning public safety answering points (PSAPs) to ports located in a telephone network, where each of the ports is associated with a calling party number (CPN) and a geographic location. The method also includes identifying an incoming emergency call from an IP device. The IP device corresponds to a unique machine access code address and the incoming emergency call includes an incoming CPN. The entry port associated with the IP device is determined based on the unique machine access code address and the incoming CPN. The incoming emergency call is connected to the PSAP corresponding to the entry port. The CPN and the geographic location data are transmitted to the PSAP corresponding to the entry port.

Additional embodiments of the present invention include a system for providing a regional E911 network. The system includes: one or more PSAPs; an ISCP including a regional ALI database; a switch; a router with one or more ports in communication with the switch; an IP device in communication with one of the ports in the router; and a network location server (NLS). The NLS includes a local ALI database and is in communication with the PSAP, the ISCP and the switch. The NLS contains instructions to implement a method including identifying an incoming emergency call from the IP device. The IP device corresponds to a unique machine access code address and the incoming emergency call includes an incoming CPN. The entry port associated with the IP device is determined based on the unique machine access code address and the incoming CPN. The incoming emergency call is connected to the PSAP corresponding to the entry port. The CPN and the geographic location data are transmitted to the PSAP corresponding to the entry port.

Further embodiments of the present invention include a computer program product for providing a regional E911 network that includes a storage medium readable by a processing circuit and storing instructions for execution by the processing circuit for facilitating a method. The method includes assigning public safety answering points (PSAPs) to ports located in a telephone network, where each of the ports is associated with a calling party number (CPN) and a geographic location. The method also includes identifying an incoming emergency call from an IP device. The IP device corresponds to a unique machine access code address and the incoming emergency call includes an incoming CPN. The entry port associated with the IP device is determined based on the unique machine access code address and the incoming CPN. The incoming emergency call is connected to the PSAP corresponding to the entry port. The CPN and the geographic location data are transmitted to the PSAP corresponding to the entry port.

Other systems, methods and/or computer program products according to embodiments will be or become apparent to one with skill in the art upon review of the following drawings and detailed description. It is intended that all such additional systems, methods, and/or computer program products be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE INVENTION

Exemplary embodiments of the present invention provide the ability to use the medium access control (MAC) address from an IP device and a calling party number (CPN) to allow a network location server (NLS) (e.g., Sonus) to map the IP device to a current geographic location. The 911 call is routed by MAC address and CPN to the NLS and then the NLS routes the 911 call to the correct PSAP. In addition, automatic location information (ALI), including location data, is routed to the PSAP to be displayed on the screen of a 911 operator.

Figure 1:
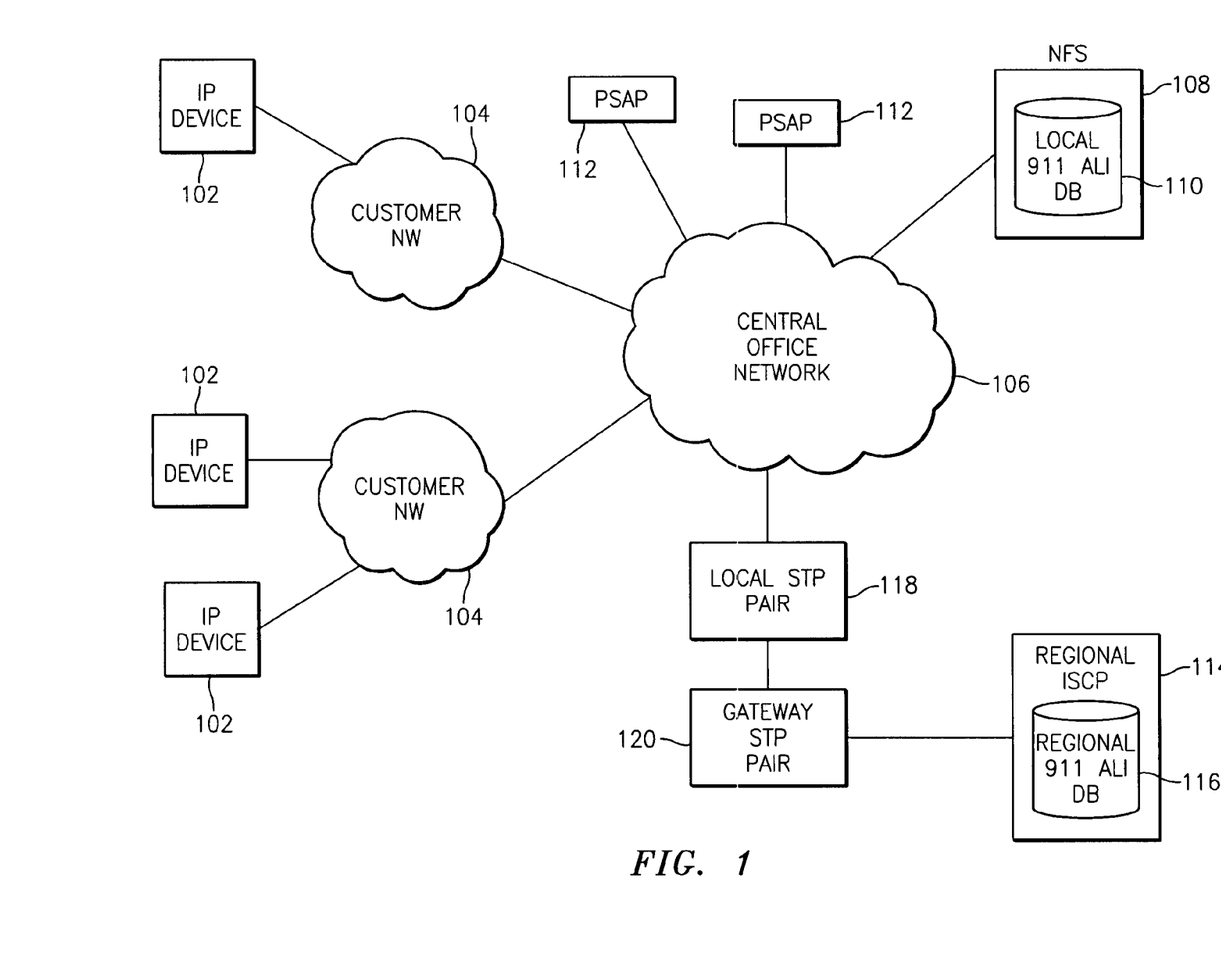
FIG. 1 is a block diagram of a system for supporting a regional E911 edge network according to exemplary embodiments of the present invention.

FIG. 1 is a block diagram of a system for supporting a regional E911 edge network according to exemplary embodiments of the present invention. As depicted in FIG. 1 embodiments of the present invention include one or more IP devices 102 in communication with one or more customer networks 104. The IP devices 102 include any devices with telephone features that are capable of accessing the Internet; including wireless phones and wired phones. In addition, the IP devices 102 may belong to customers that are pre-registered with the telephone company call handling system for advanced calling features (e.g., Class 5 features). Alternatively, the 911 calls may come straight from the Internet from customers who are utilizing the telephone call handling system for E911 service only. Each customer network 104 may be any network known in the art including, but not limited to, a voice over internet protocol (VoIP), a wide area network (WAN), a local area network (LAN), a global network (e.g. Internet), a virtual private network (VPN), and an intranet. The customer networks 104 may be implemented using wireless networks or any kind of physical network implementations known in the art. In exemplary embodiments of the present invention the customer network 104 is a sixty-four gigabyte Ethernet.

Also depicted in FIG. 1 is a central office network 106. The central office network 106 is in communication with other central office networks via a regional intelligent service control point (ISCP) 114 and in communication with customer networks 104 via methods known in the art (e.g., a gateway). In addition, a network file server (NFS) 108 is in communication with the central office network 106. The NFS 108 includes hardware and instructions to implement exemplary embodiments of the present invention as described below. A local 911 ALI database 110 is included in the NFS 108. The local 911 ALI database 110 is stored on a storage device that may be implemented using a variety of devices for storing electronic information. It is understood that the storage device may be implemented using memory contained in the central NFS 108. The storage device is logically addressable as a consolidated data source across a distributed environment and the physical data may be located in a variety of geographic locations depending on application and access requirements. Information stored in the storage device may be retrieved and manipulated via the NFS 108.

The local 911 ALI database 110 contains a record for each locally registered user. In exemplary embodiments of the present invention, a local ALI database record includes a CPN, a MAC address and an emergency location identification number (ELIN). The ELIN includes an identification number that corresponds to a PSAP that provides emergency services for the geographic location where the CPN is located. The central office network 106 also includes access to one or more PSAPs 112 that correspond to geographic locations served by the central office network 106. The central office network 106 routes 911 calls and associated data to a PSAP 112.

FIG. 1 also includes a local signal transfer point (STP) pair 118 that is in communication with a gateway STP pair 120. The gateway STP pair 120 is in communication with a regional ISCP 114. The regional ISCP 114 includes hardware and instructions to perform the processing described below. The regional ISCP 114 also includes a regional 911 ALI database 116. Exemplary embodiments of the regional 911 ALI database 116 include the same information as the local 911 ALI database 110 with the addition of a subsystem number (SSN) to reference back to the local ALI database 110 containing the local copy of the record associated with the CPN/MAC address. The regional 911 ALI database 116 may be utilized to provide back-up to the local 911 ALI database 110. Alternate exemplary embodiments include multiple regional ISCPs 114 communicating with one or more national ISCPs.

Figure 2:
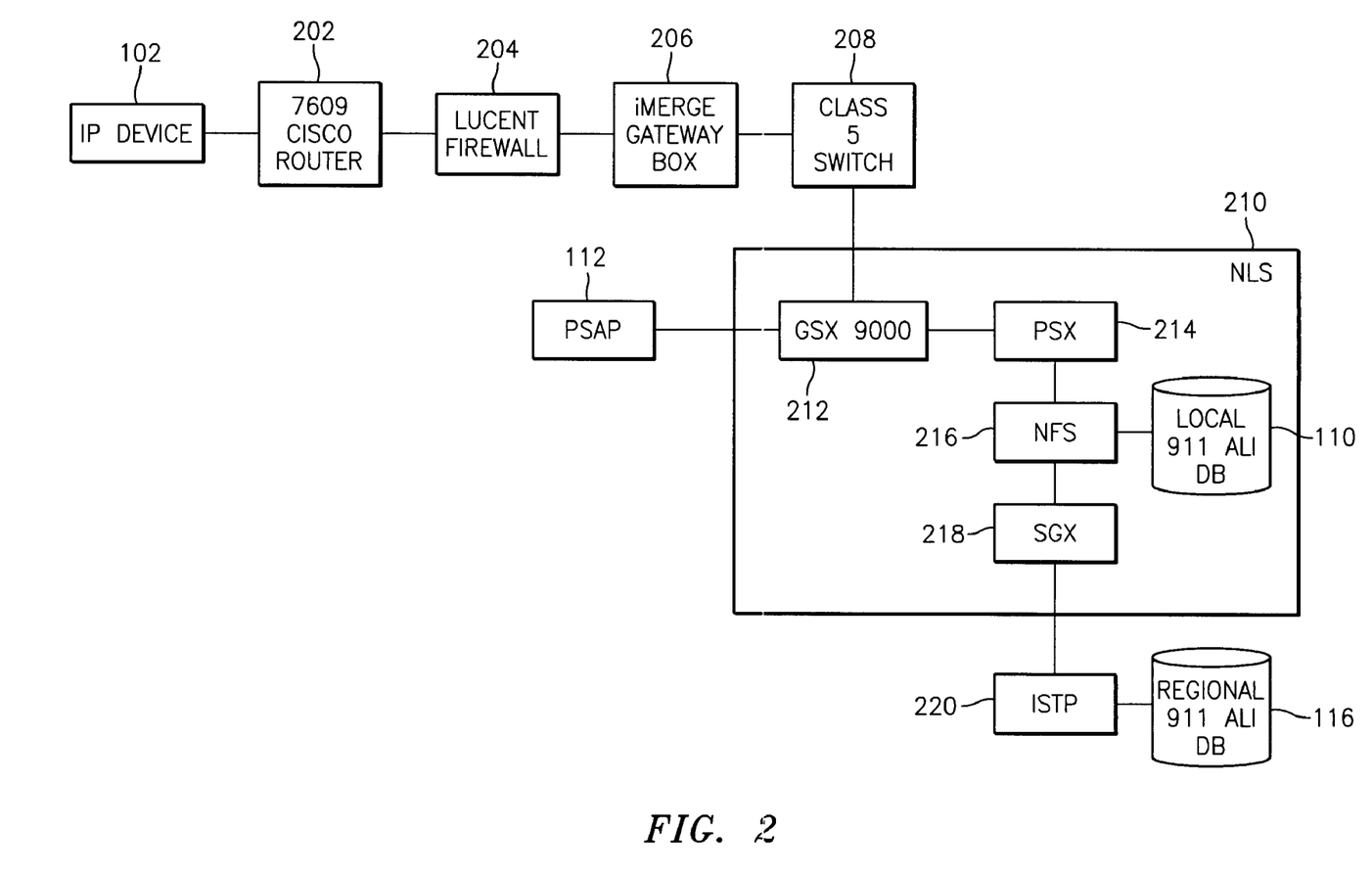
FIG. 2 is a block diagram of a system for supporting a regional E911 edge network according to exemplary embodiments of the present invention.

FIG. 2 is a block diagram of a system for supporting a regional E911 edge network according to alternate exemplary embodiments of the present invention. The telephone call handling system functions are performed by an off-the shelf product called IP Centrex from BellSouth Corporation. The IP Centrex system allows a customer to have access to Class 5 Features (e.g., call-waiting, call-forwarding) while using an IP phone. When "911" is dialed by an IP device 102, the telephone call comes into the telephone company central office network 106 from the customer network 104. First, the telephone call enters a gateway router 202 (e.g., a 7609 Cisco router) and then it is routed through a firewall 204 (e.g., a 200 Lucent Brick, a 2000 Lucent Brick). Next, the telephone call is sent through the iMerge Gateway box 206. The data associated with the 911 telephone call is input to a Class 5 switch 208 via one or more of sixteen trunk level 1 (T1) lines. The NLS 210 includes a GSX 212, a PSX 214, a NFS 216, a SGX 218 and a local 911 ALI database 110. These elements may be physically located in the same geographic location or they be located in different geographic locations and connected via internal routers.

The SGX box 218 provides SS7 gateway functions and includes links in communication with the intelligent signal transfer point (ISTP) 220. The SGX box 218 is utilized to convert TCP/IP from the customer network 104 into SS7. The Class 5 switch 208 uses SS7 signaling and the ISTP 220 to communicate with the NLS 210. As depicted in FIG. 2, exemplary embodiments of the NLS 210 include a GSX 212 gateway server utilized as a NLS switch. The GSX 212 includes integrated services digital network user part (ISUP) trunks connected directly to the Class 5 switch 208. In exemplary embodiments of the present invention, these trunks are dedicated for 911 telephone calls.

An incoming 911 telephone call will cause the GSX 212 to query the PSX 214, a call management server, to see what kind of treatment (e.g., Internet termination for IP call, national call back list, link manger protocol) the incoming call should receive. For example, The PSX 214 sends a query to the NFS 216 which includes the local 911 ALI database 110. The NFS 216 compares the MAC address and CPN against what is in the local 911 ALI database 110. If there is a match, then the NFS 216 will send a response back to the GSX 212 with the CPN and routing information (e.g., the ELIN) for the corresponding PSAP 112.

The GSX 212 may utilize integrated services digital network (ISDN) lines to route the call to the PSAP 112. In addition, the local ALI database 110 record, including ELIN and CPN data, is routed to the corresponding PSAP 112 for display on a 911 operator computer screen. If there was no match in the local 911 ALI database 110 located on the NFS 216, then the NFS 216 will send out a query to the regional ISCP 114 through the SGX 218 to the ISTP 220. The ISTP 220 might or might not have an attached Integrated Services Control Point (ISCP) regional 911 ALI database 116. If the ISTP 220 doesn't have an attached ISPC regional 911 ALI database 116, then the ISTP 220 will send out queries to other ISTPs 220 until one is located. The ISTP 220 queries the regional 911 ALI database 116 to find the MAC address and CPN. If the MAC address is located in the regional ALI database 116 then the corresponding PSAP routing information (e.g., the ELIN) is transmitted as a response back to the ISTP 220. The 911 routing information would then get forwarded back to the NLS 210 located in the central office network 106. Then, the GSX 212 would send the telephone call to the PSAP 112 corresponding to the routing information. In addition, the regional ALI database 116 record information is routed to the PSAP 112 for display on a 911 operator computer screen.

In exemplary embodments of the present invention, the iMerge gateway box 206 utilizes a Gigabyte Ethernet port for updating the NLS 210. In exemplary embodiments of the present invention, mapping a physical location and address to an IP address and port occurs as the circuits are turned up. This mapping will generally not change, but the IP device 102, or customer, connecting to the port might change. Exemplary embodiments of the present invention utilize the MAC address to track the IP device 102 and associated customer information. This will allow the NLS 210 to know when a person has disconnected from a port and will initiate the updating of the 911 ALI databases 110 116 with the removal information. In addition, the NLS 210 will automatically update the 911 ALI databases 110, 116 with new port information in response to the IP device 102 being connected to a port.

Figure 3:
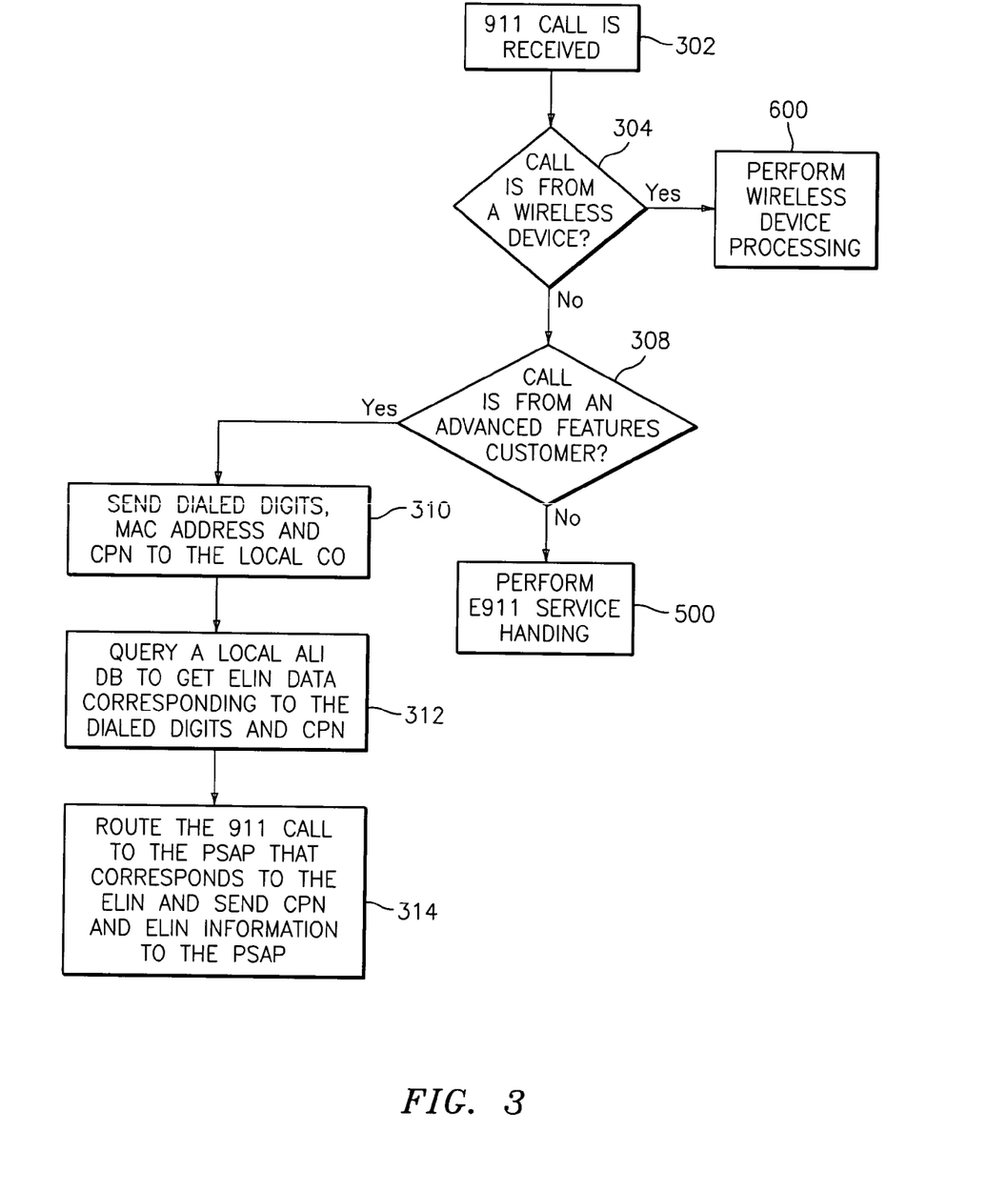
FIG. 3 is flow diagram of a process for handling an E911 telephone call from a telephone company customer according to exemplary embodiments of the present invention.

FIG. 3 is flow diagram of a process for supporting a regional E911 edge network according to exemplary embodiments of the present invention. At step 302, a 911 call is received in a central office. At step 304, it is determined if the call is from a wireless device by examining the input package associated with the 911 call. In exemplary embodiments the input package will include a twenty-digit geographic location code ("geo-location code") if the call is from a wireless device. If the call is from a wireless device, then step 600 is performed to process the 911 call from the wireless device. See FIG. 6 for a process that may be utilized by exemplary embodiments of the present invention for processing a 911 call from a wireless device. Next, at step 308, it is determined if the call is from an IP device 102 belonging to an advanced feature telephone company customer. If the call is not from an advanced feature telephone company customer, then step 500 is initiated to perform E911 service handling. In exemplary embodiments of the present invention, the 911 call is not from an advanced feature telephone customer if the CPN, or IP address, is not located in the central office network 106. See FIG. 5 for a process that may be utilized to perform E911 service handling. Otherwise, step 310 is performed to process a 911 call from an IP device 102 registered to an advanced feature customer.

At step 310, call information, including the dialed digits (i.e., "911"), the MAC address of the IP device and the CPN (e.g., the port identification of the port where the IP device is connected) is sent to a telephone call handling system (e.g., IP Centrix from BellSouth). In exemplary embodiments of the present invention, this packet is sent through a telephone company router and firewall to verify that the MAC address at the CPN corresponds to a registered IP device 102. Then, the packet is sent to a CFG (e.g., an iMerge Gateway Box). The CFG then forwards the CPN and dialed digits to the local telephone company central office. The central office utilizes the dialed digits and the CPN to route the call over special 911 trunks to a network location server (NLS) such as SONUS. A NLS switch (e.g., a GSX) is in communication with the central office via the 911 trunks. The GSX converts the call into a packet and then sends it to a router. The packet is then set to a call management server (e.g., PSX) to determine treatment. The call management server receives the dialed digits and the CPN. The call management server then sends the packet to the NFS server where the local 911 ALI database 110 is stored.

At step 312, the NFS queries the local 911 ALI database 110 to locate ELIN data that corresponds to the CPN. The NFS cross-references the CPN against the local 911 ALI database 110. The local 911 ALI database 110 includes the CPN, MAC address and ELIN. Next, at step 314, the NFS sends a packet, including the ELIN through a router to the corresponding NLS switch. The NLS switch is in communication with the PSAP serving the CPN. The packet sent to the PSAP includes the CPN and ELIN information. The NLS switch is in communication with the PSAP through links such as TCP/IP and ISDN.

In addition, to handling telephone calls from wireless devices and IP devices, embodiments of the present invention also support telephone calls from plain old telephone service (POTS) devices. The E911 telephone call may come in from a wired telephone located in a customer home. Next the telephone call is routed from a an ISDN line or trunk ton a GSX. Once the telephone call is at the GSX it is treated in the same manner as the wireless device and IP device telephone calls. The CPN is routed to the local ALI database 110 to look up the ELIN data corresponding to the CPN. The CPN will be located in the local ALI database 110 because the location of the CPN doesn't change on a POTS line. In this manner, exemplary embodiments of the present invention are backwards compatible to existing customer telephones.

Figure 4:
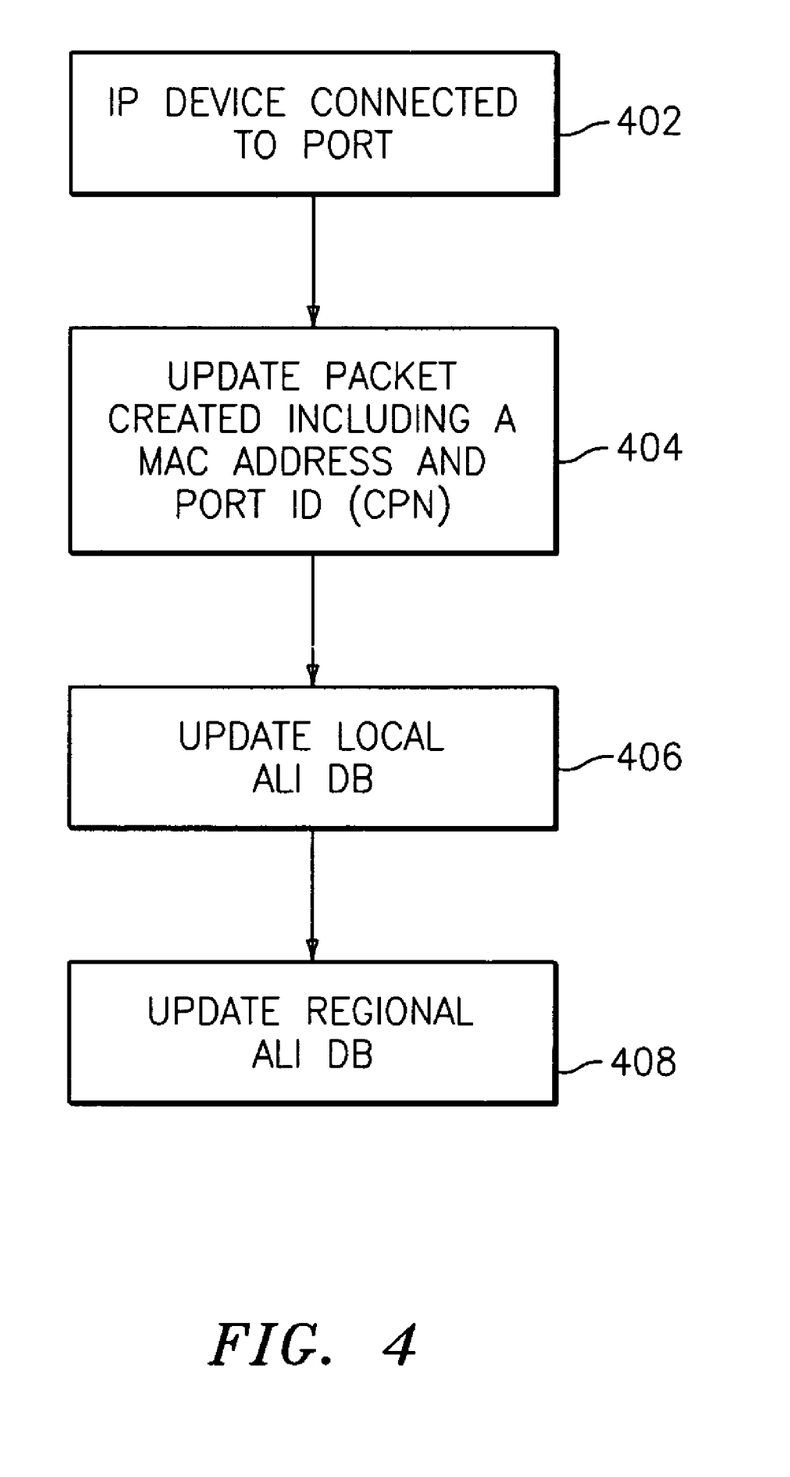
FIG. 4 is a flow diagram of a process for updating the registration of an IP device according to exemplary embodiments of the present invention.

FIG. 4 is a flow diagram of a process for updating the registration of an IP device 102 according to exemplary embodiments of the present invention. This process may be performed each time that an IP device 102 is moved (i.e., plugged in to a new port) or it may be performed, starting at step 404, before the process depicted in FIG. 3, for each 911 telephone call that is received. At step 402, an IP device 102 is connected to a port (e.g., a gigabyte Ethernet port, an ATM port, a frame relay port). When the IP device 102 is plugged in to its new location, the IP device 102 is registered with the local telephone company central office network 106. At step 404, an update packet is created that includes a MAC address and port identification (CPN). The update packet is sent to a telephone call handling system located in the central office. The telephone call handling system may utilize a signaling network management protocol (SNMP) trap to retrieve the MAC address and the CPN. The port where the IP device 102 is connected is utilized to pass the update packet to an NLS router. The router sends the packet to a call management server and the call management server forwards the update packet through the router to the NFS server. The NFS server cross-references the MAC address and the CPN in the local 911 ALI database 110. There will not be a match if the device has been moved to a port supported by a new central office.

At step 406, the local 911 ALI database 110 will be updated with the new information. Next, at step 408, the regional ALI database 116 is updated with the MAC address, CPN and ELIN data included in the local 911 ALI database 110. The NFS will send an update packet through the NLS router to the SS7 gateway. The SS7 gateway is in communication with a pair of STPs. The SS7 gateway will convert the TCP/IP protocol to SS7 protocol and will use the dialed digits to route the message. The dialed digits will determine what type of query is being sent and the receiving location. The STP may utilize a mapping process such as global title translation (GTT) to map the dialed digits to the correct sub system. This allows the STP to route the message to the regional 911 ISCP database. The message is cross-referenced against the regional 911 ALI database 116. The new record, including the MAC address, CPN, ELIN data and SSP corresponding to the local central office, is stored in the regional 911 ALI database 116. The regional 911 ISCP sends a response back to the SS7 gateway through the STP. The SS7 gateway then forwards the response back to the NFS. The response verifies that the information sent matches what is located at both the local site and the regional location. The same kind of processing may occur when an IP device 102 is unplugged from a port. Both the local and regional 911 ALI database may be updated to reflect the change.

Figure 5:
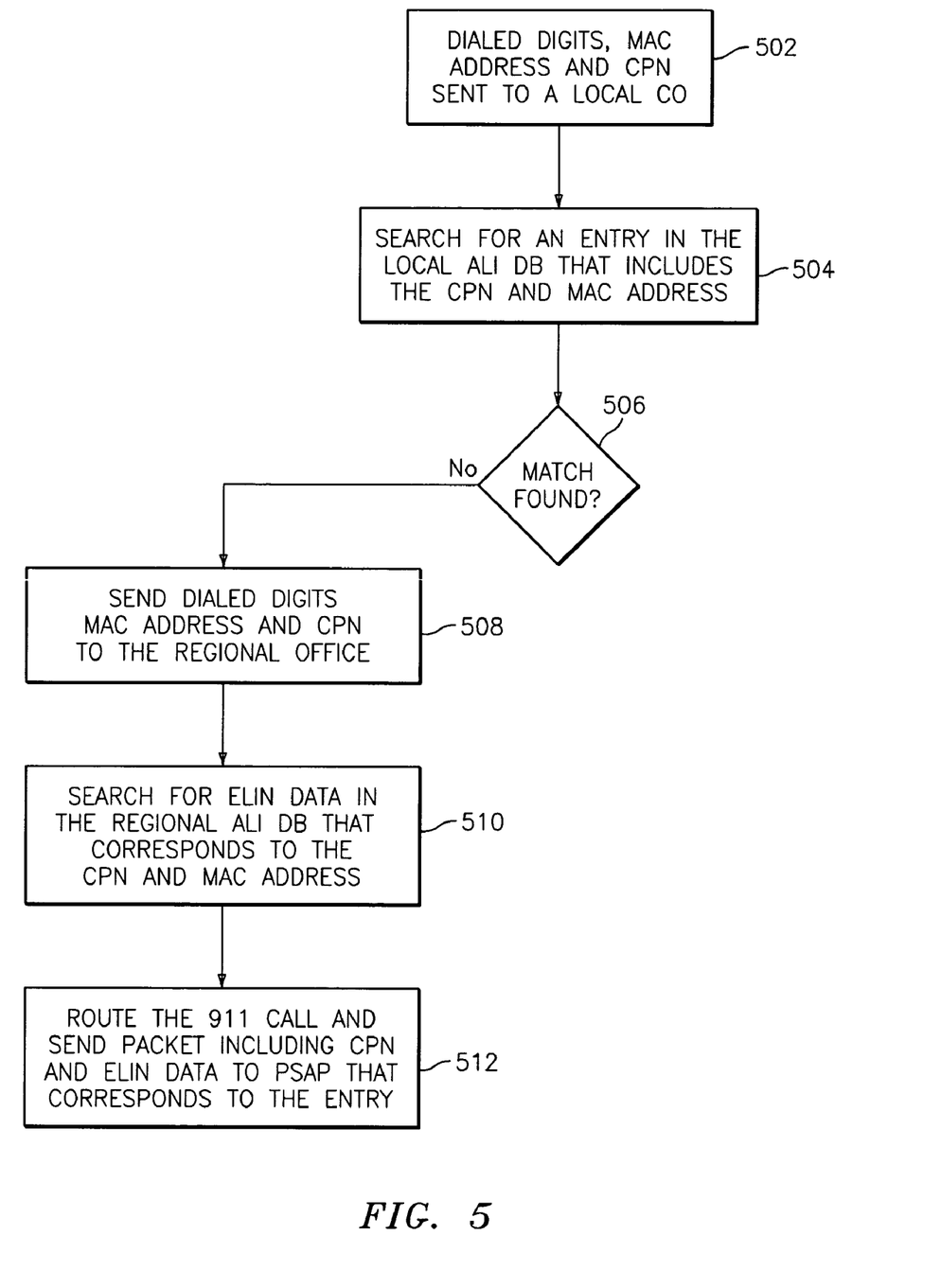
FIG. 5 is a flow diagram of a process for handling a 911 call from an IP device that utilizes the telephone company to provide E911 service according to exemplary embodiments of the present invention.

FIG. 5 is a flow diagram of a process for handling a 911 call from an IP device 102 that utilizes the telephone company to provide E911 service according to exemplary embodiments of the present invention. This process occurs when a customer's primary telephone service provider utilizes the telephone company network to supply E911 service. Prior to any telephone calls terminating on the telephone company network, the ELIN data has been supplied for each of the E911 ports being utilized by the alternate primary telephone service provider. At step 502, a telephone call from an IP device 102 terminates on the telephone company network. The telephone packet includes a MAC address, a CPN and the dialed digits (i.e., "911") and enters the telephone company network through a gateway router and firewall. In exemplary embodiments of the present invention, the packet is sent to a NLS switch and then the NLS switch sends the packet through a router to a call management server for treatment. The call management server then sends the packet to a NFS server. At step 504, the NFS server cross-references the MAC address against its local 911 ALI database 110.

If, at step 506, a match isn't found, step 508 is performed. At step 508, the dialed digits and MAC address and are sent to the regional office. The NFS sends a packet out through the router to a SS7 gateway. In exemplary embodiments of the present invention, the SS7 gateway is in communication with a pair of STPs by SS7 links. The SS7 gateway converts the TCP/IP protocol packet into a SS7 protocol packet. The SS7 gateway utilizes the dialed digits and routing tables to get the message routed to the STP. Then, the STP utilizes a routing table to route the message to the regional 911 edge ISCP database. The STP uses the dialed digits to get the proper SSN to route to the proper ALI database. At step 510, the regional 911 ISCP searches the regional ALI database 116 for ELIN and CPN data that corresponds to the MAC address. At step 512, the ISCP routes the data, including the CPN and ELIN data through the STP to a SS7 gateway. The SS7 gateway is in communication with the NFS server that is in communication with to a NLS switch. The NLS switch is in communication with the PSAP that corresponds to the ELIN (e.g., the PSAP that is serving the geographic area where the 911 originated). The SS7 gateway forwards the CPN and ELIN to the NLS switch. The NLS switch then sends the CPN and ELIN information to the PSAP.

Figure 6:
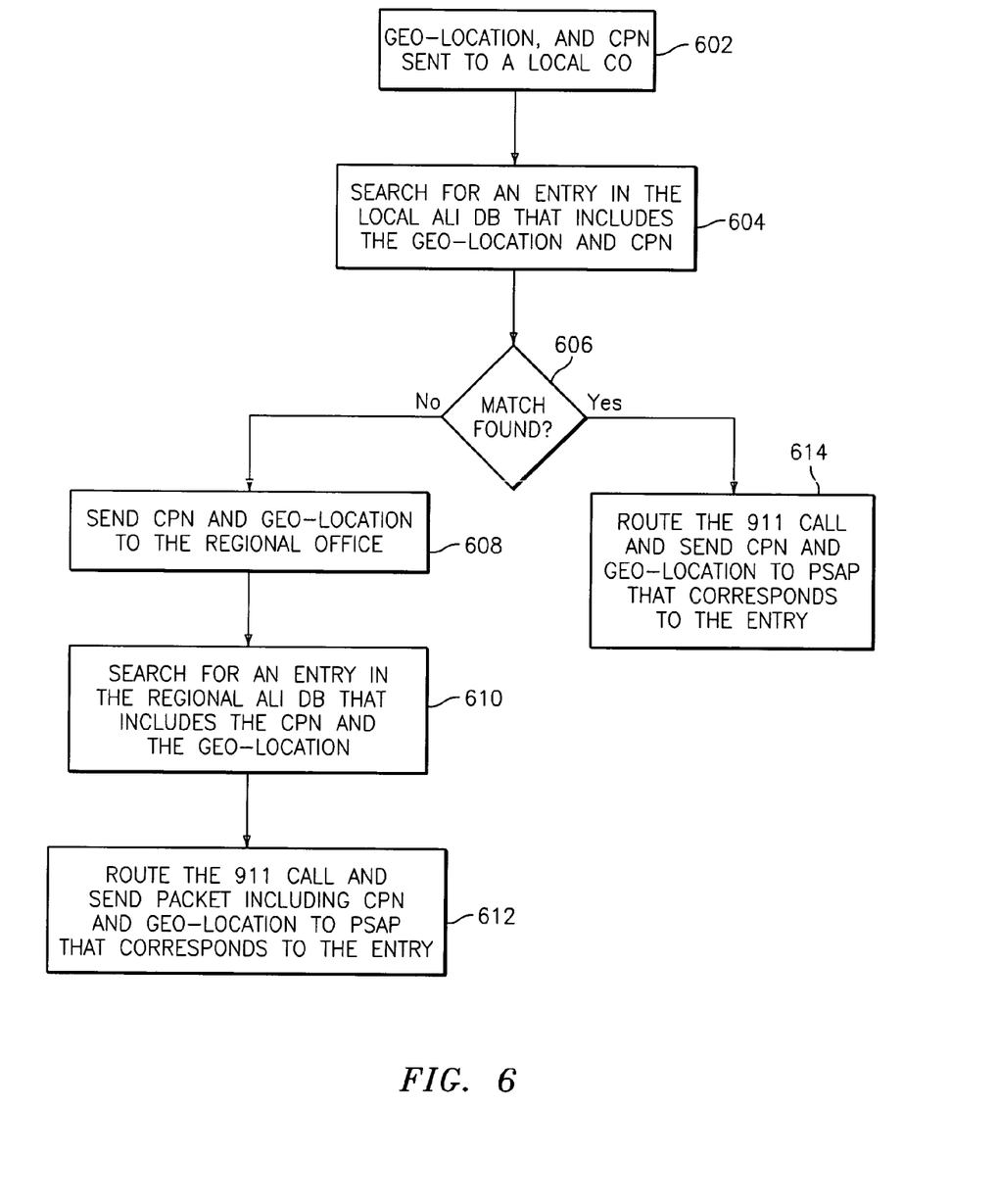
FIG. 6 is a flow diagram of a process for handling a 911 call from a wireless device according to exemplary embodiments of the present invention.

FIG. 6 is a flow diagram of a process for handling a 911 call from a wireless IP device 102 according to exemplary embodiments of the present invention. In exemplary embodiments of the present invention, the geographic location of the mobile cell customer is located utilizing a method of triangulation to produce the twenty-digit geo-location data. First, the United States is mapped into sectors with the goal of getting as granular as possible while utilizing existing references and standards. In exemplary embodiments of the present invention, the first three-digit field is country, the second three-digit field is state and the third three-digit field is county. Next is a four-digit mile field followed by a three-digit acre field. A one-digit field including sector is followed by an optional three-digit field for floor (for use in urban areas). Combining the country, state, county, mile, acre, sector, and floor fields results in a twenty-digit geo-location code that identifies a location down to a particular sector. One method of tracking the cell phone location is through triangulation on the signal strength. As the cell phone moves through the countryside its closeness to a cell site changes as does its signal strength. Thus, by utilizing two or more cell sites, it is possible to determine where a particular cell phone is geographically located. In alternate exemplary embodiments of the present invention, a GPS device located in the cell phone along with GPS location methods may be utilized to determine where the cell phone is geographically located. The correspondence between particular ranges of geo-locations and PSAPs may be provided by the cellular telephone provider. Similar to the ALI databases, a local table of mappings may be located at the central office network location and a regional table of mappings at a regional location.

At step 602, a geo-location and CPN are sent to a local telephone company central office. The wireless Internet 911 call is the same as any Internet 911 call except that the provider will also provide a twenty digit geo-location code. Prior to any telephone calls terminating on the telephone company network, the ELIN data (e.g., the corresponding PSAP) associated with the geo-location codes has been supplied by the customer's cellular telephone service provider to the telephone company network. The cell phone call could last several minutes and travel many miles and move in and out of different PSAP area's of service. The dialed digits (i.e., "911") go from the phone to the cell site in a standard manner. Then the call goes to a local telephone company central office. The CPN, dialed digits and geo-location information are sent to a NLS via dedicated 911 trunks. The NLS switch sends the packet through the router to the call management server. The call management server utilizes the CPN, dialed digits and geo-location information to route the 911 call to a NFS.

At step 604, the NFS cross-references the local 911 ALI database 110 to search for an entry that includes the CPN. If at step 606, it is determined that there is a match, then step 614 is performed and the NFS routes the packet through the router to the corresponding NLS switch. The NLS switch sends the 911 message and ELIN data to the PSAP serving the area, where the PSAP is selected based on the value of the geo-location. The message contains the CPN and the 20 digit geo-location information. Otherwise, if it was determined at step 606 that there is not a match in the local 911 ALI database 110, then step 608 is performed. At step 608, the NFS routes the packet through the SS7 gateway to convert the packed into a SS7 formatted message. The SS7 gateway utilizes the dialed digits to get the proper routing information. The SS7 gateway is connected to a pair of STPs. The STPs use routing tables and the dialed digits to locate the correct SSN. The STP uses the SSN to get the message routed to the regional 911 edge ISCP. At step 610, the 911 ISCP searches the regional 911 ALI database 116 for an entry containing the CPN. At step 612, the 911 ISCP sends out a message through the STP to the SS7 gateway that is in communication with the NLS switch that serves the corresponding area. The SS7 gateway then forwards the packet to the NLS switch through the router. The packet contains the CPN and the geo-location. If a MAC address is available it may also be included in the packet. The NLS switch is in communication with the PSAP that serves the area of interest by a link such as an ISDN or TCP/IP. The message sent to the PSAP includes the CPN, ELIN data and geo-location.

Exemplary embodiments of the present invention provide the ability for customers to be able to access E911 from an IP network. Exemplary embodiments of the present invention allow the geographic location of an IP device 102 to be determined based on a MAC address and CPN (e.g., an entry port). The customer is not required to take any special action for this to occur. When the customer accesses the telephone network, the entry port is recorded. The entry port, or CPN, is utilized to determine an associated PSAP for any 911 calls from the customer device. In addition, embodiments of the present invention may be utilized with any type of telephone device known in the art. For example, the customer may utilize a cellular telephone, a wireless IP connected telephone, a computer, or a wired telephone (e.g., plain old telephone service (POTS)).

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing a regional E911 network, said method comprising:
   assigning public safety answering points (PTAPs) to ports located in a telephone network, wherein each said port is associated with a calling party number (CPN) and a geographic location;
   identifying an incoming emergency call from an IP device, said IP device corresponding to a unique machine access code address and said incoming emergency call including an incoming CPN;
   determining which said port is an entry port associated with said IP device, wherein input to said determining includes said unique machine access code address and said incoming CPN;
   connecting said incoming emergency call to one of PSAPs corresponding to said entry port; and
   transmitting said CPN and said geographic location data to one of said PSAPs corresponding to said entry port; and
   mapping a physical location and address to said IP device and said entry port, in response to a moving of said IP device.

2. The method of claim 1 wherein said determining includes:
   searching a local automatic location information (ALI) database for said entry port corresponding to said incoming CPN and to said machine access code address; and
   if said incoming CPN is not located in said local ALI databases then searching a regional ALI database for said entry port corresponding to said incoming CPN and to said machine access code address.

3. The method of claim 2 wherein said local ALI database is updated in response to said IP device being connected to one of said port.

4. The method of claim 2 wherein said regional ALI database is updated in response to said IP device being connected to one of said ports.

5. The method of claim 2 wherein said local ALI database is updated in response to said IP device being disconnected from one of said ports.

6. The method of claim 2 wherein said regional ALI database is updated in response to said IP device being disconnected from one of said ports.

7. The method of claim 1 wherein said incoming emergency call is from an advanced features customer.

8. The method of claim 1 wherein said incoming emergency call is from an E911 service handling customer.

9. The method of claim 1 wherein said incoming emergency call is from a wireless device.

10. The method of claim 1 wherein said geographic location data is an emergency location identification number.

11. The method of claim 1 wherein said geographic location data is geodetic.

12. The method of claim 11 wherein said geodetic data includes GPS data.

13. The method of claim 11 wherein said goedetic data includes a geo-location code including a country field, a state field, a county field, a mile field, an acre field, a sector field and a floor field.

14. The method of claim 13 wherein said country field is three digits, said state field is three digits, said county field is three digits, said mile field is four digits, said acre field is three digits, said sector field is one digit and said floor field is three digits.

15. A system for providing a regional E911 network, said system comprising:
   one or more PSAPs;
   an ISCP including a regional ALI database;
   a switch;
   a router including one or more ports and in communication with a switch;
   an IP device in communication with one of said ports in said router; and
   a network location server (NLS) including a local ALI database, said NLS in communication with said PSAP, said ISCP and said switch, wherein said NLS includes instructions to implement a method comprising:
      identifying an incoming emergency call from said IP device, said IP device corresponding to a unique machine access code address and said incoming emergency call including an incoming CPN;
      determining which said port is an entry port associated with said IP device, wherein input to said determining includes said unique machine access code address and said incoming CPN;
      connecting said incoming emergency call one of said PSAPs corresponding to said entry port; and
      transmitting said CPN and said geographic location data to one of said PSAPs corresponding to said entry port; and
      mapping a physical location and address to said IP device and said entry port in response to a moving of said IP device.

16. The system of claim 15 wherein said determining includes:
   searching said local automatic location information (ALI) database for said entry port corresponding to said incoming CPN and to said machine access code address; and
   if said incoming CPN is not located in said local ALI databases then transmitting a request to search said regional ALI database for said entry port corresponding to said incoming CPN and to said machine access code address.

17. The system of claim 15 wherein said NLS further includes a NLS switch, a gateway server, a network file server and a call management server.

18. The system of claim 15 further including a firewall in communication with said router and said switch.

19. The system of claim 15 wherein said switch of a class 5 switch.

20. The system of claim 15 wherein said IP device is a wireless telephone.

21. The system of claim 15 wherein said IP device is a wired telephone.

22. The system of claim 15 wherein said IP device is a cellular telephone.

23. The system of claim 15 wherein said switch uses SS7 signaling.

24. The system of claim 15 wherein said connecting said incoming emergency call to one of said PSAPs is performed using SS7.

25. A computer program product for providing a regional E911 network, the computer program product comprising:
   a storage medium readable by a processing circuit and storing instructions for execution by the processing circuit for facilitating a method comprising:
      assigning public safety answering points (PSAPs) to ports located in a telephone network, wherein each said port is associated with a calling party number (CPN) and a geographic location;
      identifying an incoming emergency call from an IP device, said IP device corresponding to a unique machine access code address and said incoming emergency call including an incoming CPN;
      determining which said port is an entry port associated with said IP device, wherein input to said determining includes said unique machine access code address and said incoming CPN;
      connecting said incoming emergency call to one of said PSAPs corresponding to said entry port; and
      transmitting said CPN and said geographic location data to one of said PSAPs corresponding to said entry port; and
      mapping a physical location and address to said IP device and said entry port, in response to a moving of said IP device.

* * * * *